United States Patent [19]
Uchigaki et al.

[11] 3,928,281
[45] Dec. 23, 1975

[54] BACKING AGENT FOR CARPET
[75] Inventors: Taku Uchigaki; Masataka Noro, both of Mie, Japan
[73] Assignee: Mitsubishi Petrochemical Co., Ltd., Tokyo, Japan
[22] Filed: Sept. 3, 1974
[21] Appl. No.: 502,339

[30] Foreign Application Priority Data
Sept. 3, 1973 Japan.............................. 48-98221

[52] U.S. Cl......... 260/42.39; 260/42.46; 260/859 R
[51] Int. Cl.².......................... C08K 3/34; C08K 3/26
[58] Field of Search........... 260/42.39, 42.46, 859 R

[56] References Cited
UNITED STATES PATENTS
3,310,604  3/1967  Steingiser et al................ 260/859 R
3,312,755  4/1967  Cappuccio et al............. 260/859 R Primary Examiner—Lewis T. Jacobs
Attorney, Agent, or Firm—Sughrue, Rothwell, Mion, Zinn & Macpeak

[57] ABSTRACT

A backing agent for adhering a carpet backing to a carpet comprising 1. a mixture of about 90 to 20 percent by weight of atactic polypropylene and about 10 to 80 percent by weight of a urethane prepolymer having an isocyanate group at the terminals of the molecule, and 2. about 5 to 60 percent by weight of an inorganic filler based on the total weight of the mixture and the inorganic filler.

6 Claims, 2 Drawing Figures

BACKING AGENT FOR CARPET

BACKGROUND OF THE INVENTION

1. FIELD OF THE INVENTION

This invention relates to an improvement in a backing agent for a carpet backing, and, more specifically, to an improvement in a backing agent of the hot melt type to be coated on the back surface of carpets such as a Wilton carpet or a needle-punched carpet or to be applied between the carpet pile and a second backing.

2. DESCRIPTION OF THE PRIOR ART

As a backing agent, i.e., a bonding and coating agent, in use on carpets and rugs, (a) a latex-type backing agent comprising a dispersion in water of a natural or synthetic rubber latex as a main constituent, a curing agent for the latex and a filler such as calcium carbonate, or (b) a hot melt-type backing agent comprising mainly a thermoplastic synthetic resin, for example, atactic polypropylene, low density polyethylene, an ethylene/vinyl acetate copolymer and so on, is generally used. Both of these backing agents (a) and (b) have disadvantages, and are not entirely satisfactory.

Since the backing agent (a) is used in the form of an aqueous dispersion, it is necessary to remove water, by drying after the backing agent is applied to a woven carpet material. Because of the necessity for this drying step, instantaneous bonding not only is unexpected but also carpet productivity is reduced. Furthermore, a large size heating device is often required.

On the other hand, backing agent (b) has the advantage that the speed of production is high because with the use of backing agent (b) the drying step can be omitted and instantaneous bonding can be effected by solidifying the melted backing agent. However, use of backing agent (b) has the defect that the bonding strength in practical use after a few weeks have passed from carpet fabrication is poorer than when backing agent (a) is used.

In order to impart elasticity and higher weight to the carpet and also to reduce the cost of the backing agent, an inorganic filler is often added to the backing agent. Where the viscosity of the backing agent increases as the amount of the filler added increases, the backing agent must be heated to a high temperature until it has sufficient flowability for use. Conversely, if the amount of the filler is reduced in order to facilitate coating at low temperatures, the fabricated carpet lacks weight and elasticity. Especially where the warp and weft yarns of the base cloth of a carpet are made of stretched products such as polypropylene yarns as shown in the accompanying drawings, the stretched product shrinks when a backing agent is applied at a temperature higher than 130°C. As a result the base cloth is deformed. The inorganic filler cannot be added in large quantities to a backing agent since the backing agent must have a sufficient viscosity to permit coating at low temperatures.

Thus, the water dispersion-type latex backing agent (a) is now in widespread use because of its low cost, in spite of the fact that a reduction in productivity occurs when this type of backing agent is used as a bonding and coating agent for bonding a backing to a woven carpet material.

SUMMARY OF THE INVENTION

It is an object of this invention, therefore, to provide a backing agent, as a bonding and coating agent, for a carpet backing, which is free from the above described defects of conventional backing agents for a carpet backing.

This invention provides a backing agent for a carpet backing comprising 1. a mixture of about 90 to 20 percent by weight of atactic polypropylene and about 10 to 80 percent by weight of a urethane prepolymer having an isocyanate group at the terminals of the molecule, and
2. about 5 to 60 percent by weight of an inorganic filler based on the total weight of the mixture and the inorganic filler.

DETAILED DESCRIPTION OF THE INVENTION

Figure 1:
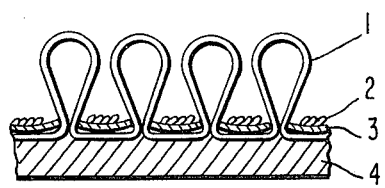
FIG. 1 is a vertical sectional view of a tufted carpet, in which reference numeral 1 represents a pile yarn; 2, a weft yarn; 3, a warp yarn; and 4, a layer of a backing agent.

The invention will be described in greater detail below.

The urethane prepolymer having an isocyanate group (-NCO) at the terminals of the molecule is used in a proportion of about 10 to 80 percent by weight with about 90 to 20 percent of atactic polypropylene. The urethane prepolymers which can be used in this invention have a molecular weight of about 1,000 to 10,000, a mean molecular weight of about 3,500 and an amine equivalent of about 1,100 to 1,200. This urethane prepolymer is obtained by condensation polymerization of at least one diisocyanate compound and at least one diol compound in the presence of a condensing agent such as, for example, stannous octoate, triethylenediamine, dibutyl tin dilaurate, etc.

The diisocyanate compounds which can be employed in this invention have a molecular weight of about 168 to about 400, and also can be represented by the following general formula,

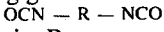
OCN — R — NCO wherein R represents an aliphatic group or an aryl group, preferably an aryl group. Examples of diisocyanate compounds which can be used are 1,5-naphthylene-diisocyanate, 3,3'-dimethyldiphenyl-4,4'-diisocyanate (toluene diisocyanate), 4,4'-diphenylmethane diisocyanate, 3,3'-dimethyldiphenylmethane-4,4'-diisocyanate, polymethylenepolyphenyl-isocyanate, 1,3-dimethylbenzol-4,6-diisocyanate, 1,4-naphthylene-diisocyanate, 3,3'-dimethoxybiphenyl-4,4'-diisocyanate, 2-nitrobiphenyl-4,4'-diisocyanate, 2,2'-dimethyldiphenylmethane-4,4'-diisocyanate and hexamethylenediisocyanate. These compounds can be used either alone or in admixture.

The diol compounds which can be employed in this invention have a molecular weight of about 62 to about 4,000, and also can be represented by the following general formula,

R(OH)$_2$ wherein R represents an aliphatic group. Examples of suitable diol compounds are monomers or polymers of ethylene glycol, propylene glycol, 1,4-butanediol, neopentyl glycol, 1,4-butynediol and trimethylol propane, and polytetramethylene ether glycol. These diol compounds can be used either alone or in admixture.

Preferred urethane prepolymers have a Brookfield viscosity of at least about 300,000 centipoises but not higher than 2,500,000 centipoises at 25°C. A suitable molar proportion of the diisocyanate compound to the diol compound ranges from about 1.8 : 1 to 2 : 1.

The isocyanate groups at the terminals of the molecule induce a molecular chain extending reaction with moisture in the air after the bonding agent is applied. The reaction is shown below by schematic (1). This reaction causes the molecular weight of the urethane prepolymer to increase and the backing agent to increase in cohesive force. Furthermore, as is shown by the following schematic (2), if the base material of the carpet has an active hydrogen atom, the terminal isocyanate groups further increase the bond strength in the interface between the carpet base material and the carpet backing.

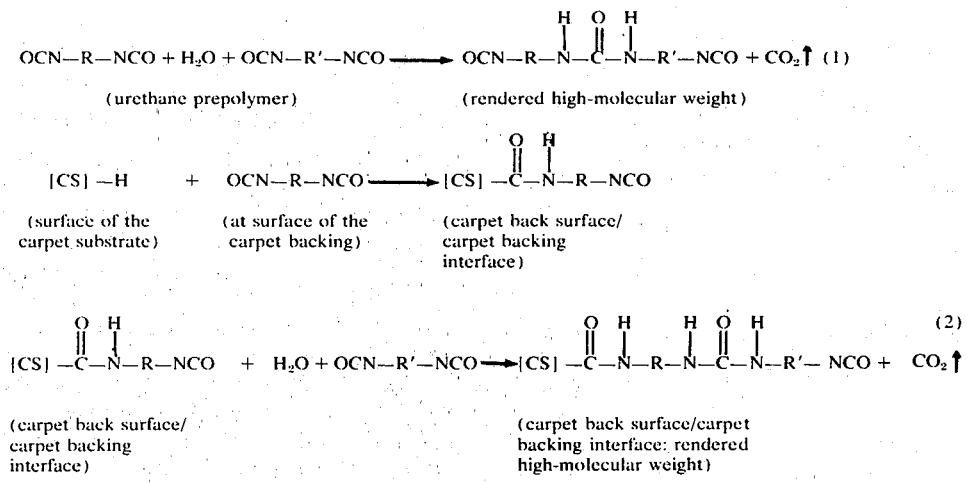

In the backing agent of this invention, atactic polypropylene is used in a proportion of about 90 to 20 percent by weight with the urethane prepolymer. The atactic polypropylene comprises mainly atactic polypropylene (APP) expressed by the rational formula $-(CH_2-CHR)_n$ (in which R is $CH_3$) which comprises a major proportion of a non-crystalline amorphous portion and in which the substituent R is in a random steric arrangement. Preferably, the atactic polypropylene used in this invention has a specific gravity of about 0.8 to 0.9, a molecular weight of about 2,000 to 100,000, preferably 7,000 to 50,000, n-heptane soluble parts of about 100 percent, an intrinsic viscosity, $[\eta]$, of about 0.27 to 0.40, which is measured in tetralin at 135°C, and a softening point of about 90° to 150°C. Since the atactic polypropylene is produced as a by-product in the polymerization of propylene, and is available at low cost, the use of atactic polypropylene is commercially advantageous.

The bonding agent of this invention is prepared by adding a non-porous inorganic filler to a mixture of the above-described urethane prepolymer having isocyanate groups at the terminals and the atactic polypropylene. The inorganic filler is added in an amount of about 5 to 60 percent, preferably 10 to 45 percent, by weight based on the total weight of the mixture and the inorganic filler. Examples of suitable inorganic fillers which can be used are $CaCO_3$, $Al(OH)_3$, clay and talc, with $CaCO_3$ and $Al(OH)_3$ being preferred. The inorganic filler can be used either alone or as a mixture thereof. The average particle size of the inorganic filler is generally about 0.1 to 30 microns, preferably 0.1 to 7 microns.

A suitable tacky resin such as a perpene-phenol copolymer resin, a petroleum resin, rosin or a wax can be added to the above three ingredients in order to adjust the resiliency of the carpet or impart suitable permeability to the pile fabric. The tacky resin can be present in an amount of up to about 25 percent by weight, preferably below 10 percent by weight based on the weight of the polymer in the backing agent used.

The ratio of the urethane prepolymer to the atactic polypropylene is adjusted to about 10 to 80 : 90 to 20 (percent by weight) in this invention. If the concentration of the atactic polypropylene is less than about 20 percent by weight, instantaneous bond strength between a pile fabric or the like and a cellulosic first backing such as jute or the like is weak. Accordingly, it is impossible to cut the resulting carpet to the desired size immediately after its preparation. On the other hand, if the concentration of the atactic polypropylene is above about 90 percent by weight, the concentration of the urethane prepolymer is reduced, and therefore, the peel strength after a few weeks between the pile fabric and the jute at a temperature of 60°C is weak. This poses a problem during the use of the carpet. Furthermore, if the proportion of the urethane prepolymer is less than about 10 percent by weight, long periods of time are required for moisture absorption and curing, and a firm bond strength in practical use cannot be obtained.

The proportions of the atactic polypropylene and the isocyanate-terminated urethane prepolymer are determined on the above basis.

The proportion of the inorganic filler is limited to about 5 to 60 percent by weight based on the total weight of the mixture of the atactic polypropylene and the isocyanate-terminated urethane prepolymer and the inorganic filler. If the proportion of the inorganic filler is less than about 5 percent by weight, the carpet does not exhibit a high weight. Furthermore, the backing agent becomes expensive. On the other hand, if the proportion of the inorganic filler exceeds about 60 percent by weight, the viscosity of the backing agent in use is high, and it is difficult to apply the coating agent using a conventional coating roll or the like. Furthermore, the bonding agent becomes brittle and the elasticity of the carpet is decreased. The proportion of the inorganic filler is thus determined on the above basis.

Since the backing agent of this invention exhibits a very high bond strength and can be easily applied, the excellent advantage of providing carpets at low cost and in great quantities with improved productivity can be obtained. The backing agent of this invention can be applied to the carpet at a temperature of about 100° to 130°C such that the carpet pile, e.g., polypropylene, fabric is not affected, and at a viscosity of about 3,000 to 10,000 cps, and then if a backing such as a jute backing is to be adhered, the backing simply contacted with the applied backing agent layer and thereby adhered thereto.

Figure 2:
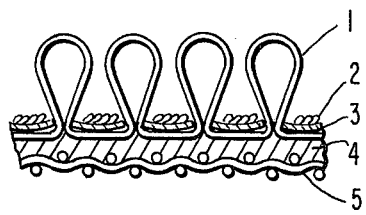
FIG. 2 is a vertical sectional view of a tufted carpet, in which the reference numerals 1, 2, 3 and 4 are the same as in FIG. 1 and 5 represents a second backing.

The backing agent of this invention can comprise a layer as shown in the embodiment in FIG. 1 or can be used as a bonding agent to bond a second backing as shown in the embodiment in FIG. 2. Further the backing agent can be used to bond to carpets and backings of generally any type made of any material such as wool, polyamide, polypropylene, rayon, polyester, jute, etc.

The invention will be illustrated more specifically by reference the following Examples. Unless otherwise indicated, all parts, percents, ratios and the like are by weight.

EXAMPLES 1 AND 2 AND COMPARATIVE EXAMPLES 1 TO 5

Each of the backing agents indicated in Table 1 was used to bond a pile fabric (of isotactic polypropylene yarn shrinking at about 135°C) to a jute backing at each of the coating temperatures indicated in Table 1. The pile yarn pulling strength and the peel strength between the pile fabric and the jute backing were measured, and the results obtained are shown in Table 1.

The amount of the backing agent applied was 1000 g/m² in each case. The pile yarn pulling strength was measured by means of a Shopper tensile tester at a tensile speed of 300 mm/min. The peel strength between the pile fabric (isotactic polypropylene) and the jute backing was measured at 90° at a tensile speed of 300 mm/min. using an Instron autograph tensile tester.

The compositions of the backing agents used were as follows:

COMPARATIVE EXAMPLE 1 (latex type)

| | Parts |
|---|---|
| Carboxyl-Modified SBR Latex[1] | 100 |
| Zinc Oxide | 5 |
| Sodium Pyrophosphate | 1 |
| Calcium Carbonate | 200 |
| Water | 90 |

[1]Croslene SA No. 20, a carboxyl modified styrene-butadiene latex having a viscosity of about 3,500 cps at 25°C produced by Takeda Chemical Industries, Ltd.

COMPARATIVE EXAMPLE 2 (hot-melt type)

| | Parts |
|---|---|
| Ethylene/Vinyl Acetate Copolymer[2] | 100 |
| Rosin Glycerin Ester (softening point 70°C) | 80 |
| Paraffin Wax (115°F grade) | 20 |

[2]Vinyl acetate content about 18 mol%.

COMPARATIVE EXAMPLE 3 (hot-melt type)

| | Parts |
|---|---|
| Ethylene/Vinyl Acetate Copolymer (Same as Comparative Example 2) | 100 |
| Rosin Glycerin Ester (softening point 70°C) | 80 |
| Paraffin Wax (115°F grade) | 20 |
| Calcium Carbonate | 100 |

COMPARATIVE EXAMPLE 4 (hot-melt type)

| | Parts |
|---|---|
| Atactic Polypropylene (softening point: 125°C; SG: 0.9; molecular weight: 30,000 to 35,000) | 100 |
| Petroleum Resin[3] (softening point 80°C) | 100 |

[3]Petrosin No. 80 produced by Mitsui Petrochemical Co., Ltd.

COMPARATIVE EXAMPLE 5 (hot-melt type)

| | Parts |
|---|---|
| Atactic Polypropylene (same as that used in Comparative Example 4) | 100 |
| Petroleum Resin (softening point 80°C) (same as Comparative Example 4) | 100 |
| Calcium Carbonate | 100 |

EXAMPLE 1 (Present Invention)

| | Parts |
|---|---|
| Atactic Polypropylene (same as that used in Comparative Example 4) | 100 |
| Urethane Prepolymer containing -NCO at the terminals of the Molecule (an addition polymerization product between toluene diisocyanate and polypropylene glycol; viscosity about 300,000 cps; mean molecular weight about 3,500; amine equivalent about 1,150) | 50 |
| Calcium Carbonate (average particle diameter: about 0.5 to 5.0 microns) | 100 |

EXAMPLE 2 (Present Invention)

| | Parts |
|---|---|
| Atactic Polypropylene (same as that used in Comparative Example 4) | 100 |
| Urethane Prepolymer (same as that used in Example 1) | 50 |
| Calcium Carbonate (same as that used in Example 1) | 150 |

Table 1

| Samples | Coating Temperature (°C) (viscosity in cps) | Pile Yarn Pulling Strength (Kg) | Peel Strength between Pile Woven Fabric and Jute Backing (Kg/inch) | |
|---|---|---|---|---|
| | | | Below 20°C | Below 60°C |
| Comparative Example 1 | Room Temperature (20,000) | 3.0 | 2.0 | 1.2 |
| Comparative Example 2 | 200 (40,000) | 1.5 | 1.5 | 0.1 |
| Comparative Example 3 | 200 (>100,000) | 1.0 | 1.0 | 0.1 |
| Comparative Example 4 | 180 (6,000) | 1.0 | 0.8 | 0.1 |
| Comparative Example 5 | 180 (20,000) | 0.9 | 0.6 | 0.05 |
| Example 1 | 120 (6,000) | 3.5 | 2.7 | 1.8 |
| Example 2 | 120 (10,000) | 3.2 | 2.5 | 1.7 |

EXAMPLES 3 TO 5 AND COMPARATIVE EXAMPLES 6 AND 7

While the amount of calcium carbonate was maintained at 50 percent by weight based on the total weight of the inorganic filler and the mixture of atactic polypropylene (as described in Comparative Example 4) and the urethane prepolymer (as described in Example 1), the ratio between the atactic polypropylene and the urethane prepolymer was changed as shown below. Each of the backing agents was used in the same way as in Examples 1 and 2, and the pile yarn pulling strength and the peel strength were measured in the same way. The results obtained are shown in Table 2.

COMPARATIVE EXAMPLE 6

| | Parts |
|---|---|
| Atactic Polypropylene | 95 |
| Urethane Prepolymer | 5 |
| Calcium Carbonate | 50 |

EXAMPLE 3

| | Parts |
|---|---|
| Atactic Polypropylene | 90 |
| Urethane Prepolymer | 10 |
| Calcium Carbonate | 50 |

EXAMPLE 4

| | Parts |
|---|---|
| Atactic Polypropylene | 40 |
| Urethane Prepolymer | 60 |
| Calcium Carbonate | 50 |

EXAMPLE 5

| | Parts |
|---|---|
| Atactic Polypropylene | 20 |
| Urethane Prepolymer | 80 |
| Calcium Carbonate | 50 |

COMPARATIVE EXAMPLE 7

| | Parts |
|---|---|
| Atactic Polypropylene | 10 |
| Urethane Prepolymer | 90 |
| Calcium Carbonate | 50 |

Table 2

| Samples | Viscosity at the Time of Coating (cps/120°C) | Pile Yarn Pulling Strength (Kg) | Peel Strength between Pile Woven Fabric and Jute Backing (Kg/inch) | |
|---|---|---|---|---|
| | | | Below 20°C | Below 60°C |
| Comparative Example 6 | >100,000 | 1.5 | 0.6 | 0.3 |
| Example 3 | >100,000 | 2.2 | 2.1 | 1.8 |
| Example 4 | 4,500 | 3.8 | >3.0 | 2.2 |
| Example 5 | 2,500 | >4.0 | >3.0 | >3.0 |
| Comparative Example 7 | 2,000 | >4.0 | >3.0 | >3.0 |

EXAMPLES 6 TO 8 AND COMPARATIVE EXAMPLES 8 AND 9

A backing agent was prepared from 100 parts of atactic polypropylene (as described in Comparative Example 4) and 50 parts of a urethane prepolymer (as described in Example 1), and calcium carbonate in the amount shown in Table 3 below. Thus, the weight ratio of the atactic polypropylene to the urethane prepolymer was 2:1, and the proportion of the calcium carbonate based on the total weight of the atactic polypropylene, the urethane prepolymer and the calcium carbonate varied from about 3 percent to 70 percent. Each of the bonding agents was applied in the same way as in Examples 1 and 2 and the pile yarn pulling strength and the peel strength were measured in the same way. The results obtained are shown in Table 3 below.

Table 3

| Samples | Amount of Calcium Carbonate (parts) | Viscosity at the Time of Coating (cps/120°C) | Pile Yarn Pulling Strength (Kg) | Peel Strength between Pile Woven Fabric and Jute Backing (Kg/inch) | |
| --- | --- | --- | --- | --- | --- |
| | | | | Below 20°C | Below 60°C |
| Comparative Example 8 | 4 | 3,700 | >4.0 | >3.0 | 2.2 |
| Example 6 | 8 | 3,800 | >4.0 | >3.0 | 2.2 |
| Example 7 | 40 | 4,500 | 3.7 | 2.7 | 1.8 |
| Example 8 | 225 | 45,000 | 2.1 | 2.0 | 1.2 |
| Comparative Example 9 | 350 | >100,000 | 1.1 | 0.4 | 0.1 |

While the invention has been described in detail and with reference to specific embodiments thereof, it will be apparent to one skilled in the art that various changes and modifications can be made therein without departing from the spirit and scope thereof.

What is claimed is:

1. A backing agent for adhering a carpet backing to a carpet comprising
   1. a mixture of about 90 to 20 percent by weight of atactic polypropylene having a molecular weight of 2,000 to 100,000 and about 10 to 80 percent by weight of a urethane prepolymer having a molecular weight of 1,000 to 10,000, an amine equivalent of about 1,100 to 1,200 and having an isocyanate group at the terminals of the molecule, and
   2. about 5 to 60 percent by weight of a non-porous inorganic filler based on the total weight of said mixture and said inorganic filler, said backing agent having a viscosity when applied of 3,000 to 10,000 cps and said urethane prepolymer being an addition polymerization product between at least one diisocyanate compound having an isocyanate group at the terminals of the molecule and at least one diol compound.

2. The backing agent of claim 1, wherein said atactic polypropylene has a specific gravity of about 0.8 to 0.9, a molecular weight of about 2,000 to 100,000 and a softening point of about 90° to 150°C.

3. The backing agent of claim 1, wherein said urethane prepolymer has a viscosity of about 300,000 to 2,500,000 centipoises at 25°C.

4. The backing agent of claim 1, wherein said diisocyanate compound is selected from the group consisting of 1,5-naphthylenediisocyanate, 3,3'-dimethyldiphenyl-4,4'-diisocyanate, 4,4'-diphenylmethane-diisocyanate, 3,3'-dimethyldiphenylmethane-4,4'-diisocyanate, polymethylenepolyphenyl-isocyanate, 1,3-dimethylbenzol-4,6-diisocyanate, 1,4-naphthylene-diisocyanate, 3,3'-dimethoxybiphenyl-4,4'-diisocyanate, 2-nitrobiphenyl-4,4'-diisocyanate, 2,2'-dimethyldiphenylmethane-4,4'-diisocyanate, and a mixture thereof.

5. The backing agent of claim 1, wherein said inorganic filler is calcium carbonate, aluminum hydroxide, clay or talc.

6. The backing agent of claim 5, wherein said inorganic filler has an average particle size of about 0.1 to 30 microns.

* * * * *